(12) United States Patent
Suga et al.

(10) Patent No.: US 7,720,502 B2
(45) Date of Patent: May 18, 2010

(54) RADIO DEVICE AND INTERFERENCE AVOIDING METHOD BY TRANSMISSION POWER CONTROL

(75) Inventors: Hiroyoshi Suga, Tokyo (JP); Yukimasa Nagai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 337 days.

(21) Appl. No.: 11/794,223

(22) PCT Filed: Feb. 9, 2005

(86) PCT No.: PCT/JP2005/001947
§ 371 (c)(1),
(2), (4) Date: Jun. 26, 2007

(87) PCT Pub. No.: WO2006/085365
PCT Pub. Date: Aug. 17, 2006

(65) Prior Publication Data
US 2008/0009306 A1    Jan. 10, 2008

(51) Int. Cl.
H04B 7/00 (2006.01)
(52) U.S. Cl. .................... 455/522; 455/464; 455/69; 455/561
(58) Field of Classification Search ............... None
See application file for complete search history.

(56) References Cited

U.S. PATENT DOCUMENTS 6,738,646 B2 * 5/2004 Miyoshi et al. ............ 455/561

2002/0172186 A1   11/2002 Larsson
2004/0171402 A1   9/2004 Tamaki et al.

FOREIGN PATENT DOCUMENTS

| EP | 1 204 225 A1 | 5/2002 |
|---|---|---|
| GB | 2 348 572 A | 10/2000 |
| JP | 11-145899 A | 5/1999 |
| JP | 2000-217144 A | 8/2000 |
| JP | 2004-72666 A | 3/2004 |
| JP | 2004-260637 A | 9/2004 |
| JP | 2004-297247 A | 10/2004 |
| JP | 2004-533158 A | 10/2004 |
| WO | WO-02/082751 A2 | 10/2002 |
| WO | WO 02082751 A2 * | 10/2002 |
| WO | WO-2004/086683 A1 | 10/2004 |

* cited by examiner

*Primary Examiner*—Chi H Pham
*Assistant Examiner*—Kouroush Mohebbi
(74) *Attorney, Agent, or Firm*—Birch, Stewart, Kolasch & Birch, LLP

(57) ABSTRACT

Upon receiving a frame from a transmitting radio device, a propagation attenuation calculator calculates a propagation attenuation amount from information in the received frame and registers a propagation attenuation amount for each transmission rate in a table. When transmitting a frame, a transmission power controller, selects optimum transmission power to the transmission destination radio device from the table and sends the frame at the selected optimum transmission power, and detects whether there is a value smaller than the selected optimum transmission power in the optimum transmission power at a minimum transmission rate of a radio device different from a transmission destination radio device registered in the optimum transmission power table.

14 Claims, 13 Drawing Sheets

RADIO DEVICE AND INTERFERENCE AVOIDING METHOD BY TRANSMISSION POWER CONTROL

TECHNICAL FIELD

The present invention relates to a radio device applied to a radio network system. More specifically, the present invention relates to a radio device that avoids generation of wave interference by causing each radio device within a system to autonomously (open loop type) control power.

BACKGROUND ART

At present, devices have appeared in the market capable of establishing a high-speed radio network system for homes and offices. Products based on IEEE 802.11b, IEEE 802.11a, and IEEE 802.11g standardized by radio LAN standard IEEE 802.11 in the United States are examples of such devices. These radio LAN standards are based on a prerequisite that the communications is carried out in an ideal wave environment having no interference. In other words, these radio LAN standards have been established without considering the present day situation where access points (AP) are installed in high density. On the other hand, IEEE 802.11h describes a closed loop type method of obtaining transmission power (EIRP) and reception power in a Request & Response format. However, the closed loop type method is for carrying out control in the environment of association, and is not for positively avoiding generation of interference.

Patent Documents 1 to 3 describe conventional techniques for avoiding generation of wave interference in a radio network system. The Patent Document 1 discloses a technique for determining a transmission output and a communication speed based on information and reception field strength included in a signal from a radio control device, determining viable transmission power and a communication speed based on a state of the radio communication device, and performing communications based on the instructed transmission output and the instructed communication speed and a viable transmission output and a viable communication speed. In other words, the Patent Document 1 discloses, in a radio communication system, a transmission power control method of interference controlling a radio communication apparatus by adding transmission power and interference information to a transmission frame using a radio control device within a communication house facility, and a closed loop type method of changing a communication speed to carry out communications within a transmission power range prescribed from a battery residual amount of the radio communication device itself.

The Patent Document 2 discloses an open loop method of avoiding a sudden increase of transmission power, i.e., preventing causing large interference to other user, by suppressing a sudden increase of transmission power when there is a large error in measuring reception power of a desired wave signal from the other station, or when a level of a received signal suddenly decreases. Specifically, a base station has a function of estimating the amount of interference with other user from a desired wave signal to interference power ratio (SIR) obtained from a reception wave from a mobile station, determining a maximum change amount of transmission power during a control cycle of transmission power control, and instructing a maximum change amount of transmission power to the mobile station, thereby controlling interference. As a result, when there is a large error in measuring reception power of a desired wave signal from the other station, or when a level of a received signal suddenly decreases, it is possible to avoid a sudden increase of transmission power, i.e., prevent causing large interference to other user, by suppressing a sudden increase of transmission power.

The Patent Document 3 discloses the following method. A transmission path attenuation amount is calculated based on a reception CNR (Carrier to Noise Ratio) estimated from equalization error power obtained from a signal transmitted from the other transmission and receiving apparatus, and based on transmission power information included in the transmission signal from the other transmission and receiving apparatus. A transmission level having a minimum power value satisfying a reception-required CNR at the other party based on a modulation method used in the own station is determined. The determined transmission level is inserted into a control information symbol of a radio frame of a transmission signal to generate a transmission signal. A transmission level of the generated transmission signal is adjusted to the transmission level determined in advance, and the adjusted transmission signal is transmitted.

Patent Document 1: Japanese Patent Application Laid-open No. 2000-217144

Patent Document 2: Japanese Patent Application Laid-open No. H11-145899

Patent Document 3: Japanese Patent Application Laid-open No. 2004-72666

DISCLOSURE OF INVENTION

Problem to be Solved by the Invention

The conventional techniques described in the Patent Documents 1 to 3 take into consideration a subscriber radio using a TDD (Time Division Duplex) in access control. The base station manages frame synchronization, a base station accommodation terminal, and a subscriber station, thereby achieving multiplex management.

However, in the radio network system using access control according to the CSMA (Carrier Sense Multiple Access) method such as a radio LAN (Local Area Network) system, each radio terminal independently carries out carrier sense to avoid collision of packets. Therefore, when the interference avoiding method according to the conventional technique is used for the AP and the terminal of the radio LAN system, the AP and the terminal in communication adaptively change the transmission power. Accordingly, a waiting terminal that has received a signal with an RSSI (Received Signal Strength Indicator) capable of carrying out carrier sense until before the change of the transmission power becomes unable to carry out the carrier sense after the change of the transmission power of the AP and the terminal in communication. Consequently, the waiting terminal acts as a pseudo hidden terminal. There has been a problem that the AP cannot manage such a pseudo hidden terminal.

In the conventional techniques, the base station measures the amount of interference, and controls transmission power to the terminal. However, in the access control using the CSMA method used by the radio LAN system or the like, when each terminal limits the transmission power, sometimes it may happen that the terminal, which has received a signal with the RSSI capable of carrying out carrier sense until before the change of the transmission power, cannot carry out the carrier sense after the change of the transmission power. In this situation, the AP cannot estimate the pseudo hidden terminal that occurs due to the limit of the transmission power at each terminal, and cannot carry out the control that takes into account the interference amount into account.

Moreover, in the conventional techniques, adaptive modulation control is used in which information about transmission power is added into the TDD frame or report information, and propagation attenuation is calculated from a difference between the transmission power and the reception power. However, in the environment condition of low CNR, there has been a problem that information of transmission power cannot be obtained until when the system shifts to a modulation method capable of receiving the adaptive modulation control.

The present invention has been achieved in view of the above. It is an object of the present invention to achieve a radio device that autonomously calculates a propagation attenuation amount and avoids generation of interference by controlling transmission power based on the calculated amount of propagation attenuation, and an interference avoiding method by transmission power control, in a radio network system using the access control according to the CSMA method.

Means for Solving Problem

To solve the above problems and to achieve the objects, according to the present invention, a radio device applied to a radio communication system which carries out an access control using a CSMA system includes a propagation-attenuation calculating unit that calculates a propagation attenuation amount from a transmitting radio device of a reception frame to the own device, based on reception power and transmission radiation-power information included in the reception frame; and a transmission-power controlling unit that calculates optimum transmission power at each transmission rate based on the propagation attenuation amount calculated by the propagation-attenuation calculating unit and minimum necessary reception power determined for each transmission rate, registers calculated optimum transmission power into an optimum transmission power table by relating the optimum transmission power to a radio device identifier for identifying the transmitting radio device and each transmission rate, and, during transmission, selects optimum transmission power to the transmitting radio device based on the optimum transmission power table, the radio identifier of a transmission destination radio device, and the transmission rate, thereby carrying out a transmission power control of transmitting the selected optimum transmission power as a transmission frame including the selected optimum transmission power as transmission radiation-power information, and detects whether a value smaller than the selected optimum transmission power is present in the optimum transmission power at the minimum transmission rate of a radio device different from the transmission destination radio device registered in the optimum transmission power table, wherein when the transmission-power controlling unit detects presence of a value smaller than the selected optimum transmission power in the optimum transmission power at the minimum transmission rate of a radio device different from the transmission destination radio device registered in the optimum transmission power table, the transmission-power controlling unit executes a predetermined hidden-terminal-avoidance control process.

Effect of the Invention

The radio device according to the present invention calculates the propagation attenuation amount from the transmitting radio device to the own device based on the reception power and the transmission radiation-power information included in the received frame, and calculates the optimum transmission power at each transmission rate based on the calculated propagation attenuation amount and minimum necessary power determined for each transmission rate. Moreover, the radio device stores the optimum transmission power by relating the optimum transmission power to a radio device identifier for identifying the transmitting radio device and to each transmission rate. When transmitting a frame to a transmission destination radio device, the radio device selects optimum transmission power based on the radio identifier of the transmission destination radio device and a transmission rate, and transmits transmission frame including the selected optimum transmission power as transmission radiation-power information, using the selected optimum transmission power. When there is a value smaller than the selected optimum transmission power in the optimum transmission power at the minimum transmission rate of a radio device different from a transmission destination radio device, the radio device executes a predetermined hidden-terminal-avoidance control process. With this arrangement, each radio device can autonomously select optimum transmission power, and can autonomously avoid a hidden terminal generated in a pseudo manner by the selected optimum transmission power.

EXPLANATIONS OF LETTERS OR NUMERALS

Figure 1:
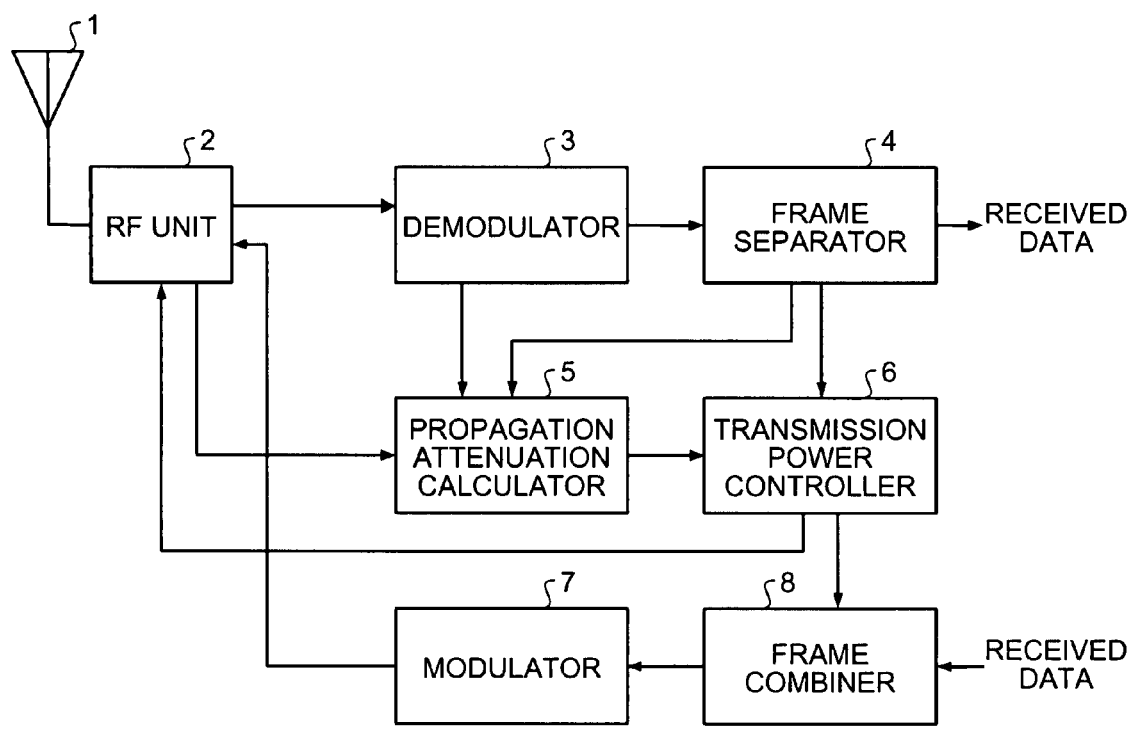
FIG. 1 depicts a configuration of a radio device according to a first embodiment of the present invention.

1 Aerial
2 RF unit

3 Demodulator
4 Frame separator
5 Propagation attenuation calculator
6 Transmission power controller
7 Modulator
8 Frame combiner
10, 20, 22, 30, 33 AP
24, 35 BBS (1)
25, 36 BBS (2)
11, 12, 13, 21, 23, 31, 32, 34 STA
50, 60 PLCP preamble field
51, 61 PLCP header field
52, 62 Transmission-power information field
53, 63 Data field
511 Rate part
512 Reservation part
513 Length part
514, 523 Parity part
515, 524 Tail part
521 TX Power part
522 Duration part
611 Frame control unit

BEST MODE(S) FOR CARRYING OUT THE INVENTION

Exemplary embodiments of a radio device and an interference avoiding method by transmission power control according to the present invention will be explained below in detail with reference to the accompanying drawings. The present invention is not limited to the embodiments.

First Embodiment

A first embodiment of the present invention is explained with reference to FIG. 1 to FIG. 5. FIG. 1 depicts a configuration of a radio device according to the first embodiment of the present invention. The radio device includes an aerial 1, an RF unit 2, a demodulator 3, a frame separator 4, a propagation attenuation calculator 5, a transmission power controller 6, a modulator 7, and a frame combiner 8.

The aerial 1 converts an electromagnetic wave signal into an electric signal, and outputs the electric signal to the RF unit 2, and also converts an electric signal received from the RF unit 2 into an electromagnetic wave signal for transmission. The RF unit 2 amplifies an electric signal input from the aerial 1, frequency-converts the amplified electric signal into a baseband signal, outputs the baseband signal to the demodulator 3, and outputs information necessary to calculate a reception-power value to the propagation attenuation calculator 5 as first reception-power information. The RF unit 2 also frequency-converts an electric signal input from the modulator 7 based on power control information, and outputs the frequency-converted electric signal to the aerial 1.

The demodulator 3 generates a reception frame by carrying out a predetermined demodulation process on the baseband signal input from the RF unit 2, and outputs the generated reception frame to the frame separator 4. The demodulator 3 also outputs information necessary to calculate a reception-power value in the demodulation process, to the propagation attenuation calculator 5, as second reception-power information.

The frame separator 4 separates control information and data included in the received data frame demodulated by the demodulator 3, and outputs the separated data to a higher device (not shown) as received data. The frame separator 4 also outputs transmission radiation-power information (a value obtained by adding transmission power, antenna characteristic, system loss, or the like) included in the control information to the propagation attenuation calculator 5.

The propagation attenuation calculator 5 calculates propagation attenuation amounts from plural transmitting radio stations to the own station, using the first reception-power information input from the RF unit 2, the second reception-power information input from the demodulator 3, and the transmission radiation-power information input from the frame separator 4. The propagation attenuation calculator 5 outputs the calculated propagation attenuation amount to the transmission power controller 6 as propagation attenuation information.

The transmission power controller 6 calculates optimum transmission power at each transmission rate, using a propagation attenuation amount of each radio device input from the propagation attenuation calculator 5, and minimum necessary reception power determined for each transmission rate. The transmission power controller 6 then registers the calculated optimum transmission power at each transmission rate into an optimum transmission power table by relating each optimum transmission power to a radio device identifier for identifying each radio device and to each transmission rate. When the own device transmits a data frame to a transmission destination radio device, the transmission power controller 6 selects optimum transmission power based on the optimum transmission power table, outputs the selected optimum transmission power to the RF unit 2 as power control information, calculates transmission radiation-power information, and outputs the calculated transmission radiation-power information to the frame combiner 8.

The frame combiner 8 generates a transmission data frame based on transmission data input from a higher device and transmission radiation-power information input from the transmission power controller 6, and outputs the transmission data frame to the modulator 7. The modulator 7 carries out a predetermined modulation process to a transmission PLCP frame input from the frame combiner 8 to modulate the frame into an electric signal of the baseband, and outputs the electric signal to the RF unit 2.

Figure 2:
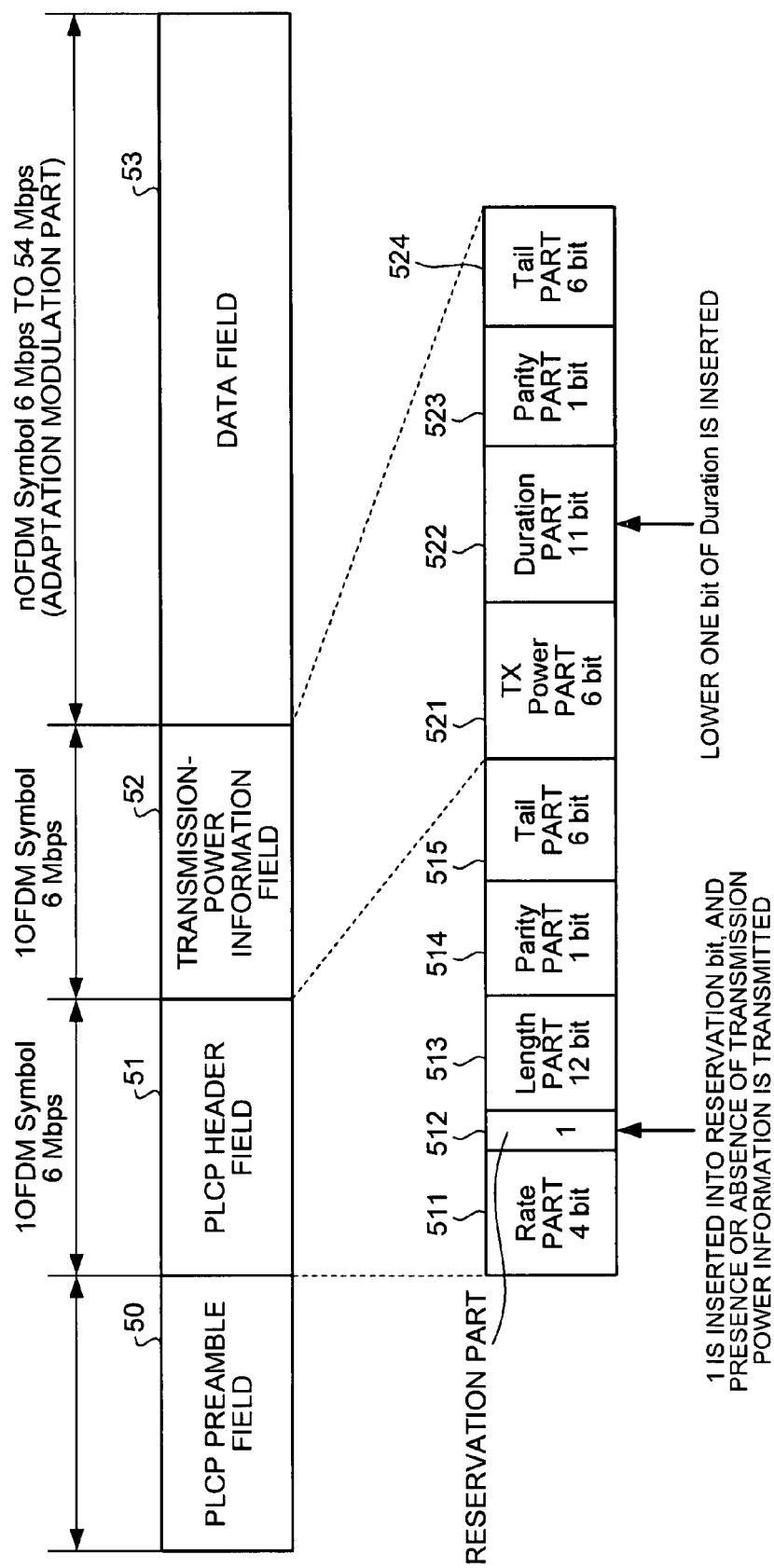
FIG. 2 is an example of a configuration of a PLCP frame including a transmission-radiation power value generated by a frame combiner shown in FIG. 1.

FIG. 2 depicts a PLCP frame as a transmission data frame including transmission radiation-power information generated by the frame combiner 8. The PLCP (Physical Layer Convergence Protocol) frame includes a PLCP preamble field 50, a PLCP header field 51, a transmission-power information field 52, and a data field 53.

The PLCP preamble field 50 is set with information used for a reception synchronization process. The PLCP header field 51 includes a four-bit Rate part 511, a one-bit reservation part 512, a 12-bit Length part 513, a one-bit Parity part 514, and a sixth-bit Tail part 515.

The Rate part 511 is set with a transmission rate of a PLCP frame. The Reservation part 512 is set with a value representing whether the PLCP frame includes the transmission-power information field 52. When "1" is set to the Reservation part 512, the Reservation part 512 represents that the PLCP frame includes the transmission-power information field 52. The Length part 513 is set with a length of the data field 53. The Parity part 514 is set with a code used to detect an error in the demodulation process. The Tail part 515 is set with a value representing the last of the PLCP header field 51.

The transmission-power information field 52 includes a six-bit TX Power part 521, an 11-bit Duration part 522, a one-bit Parity part 523, and a six-bit Tail part 524.

The TX Power part 521 is set with transmission radiation-power information. The Duration part 522 is set with transmission period information. The Parity part 523 is set with a code used to detect an error in the demodulation process. The Tail part 524 is set with a value representing the last of the transmission-power information field 52. The data field 53 is set with data to be transmitted input from a higher device.

In FIG. 2, the PLCP header field 51 and the transmission-power information field 52 have a length of one symbol as a unit of modulation used in the OFDM (Orthogonal Frequency Division Multiplexing) system. Regardless of a transmission rate of the PLCP frame, information is transmitted at a minimum transmission rate (6 Mbps in this case). In other words, the PCLP header field 51 and the transmission-power information field 52 including the transmission radiation-power information and the transmission period information are transmitted at a minimum transmission rate. Therefore, even in the environmental condition of a low CNR (Carrier to Noise Ratio), the transmission radiation-power information and the transmission period information set in the transmission-power information field 52 can be received, regardless of success or failure of the reception of the data field 53 transmitted at an optional transmission rate.

Figure 3:
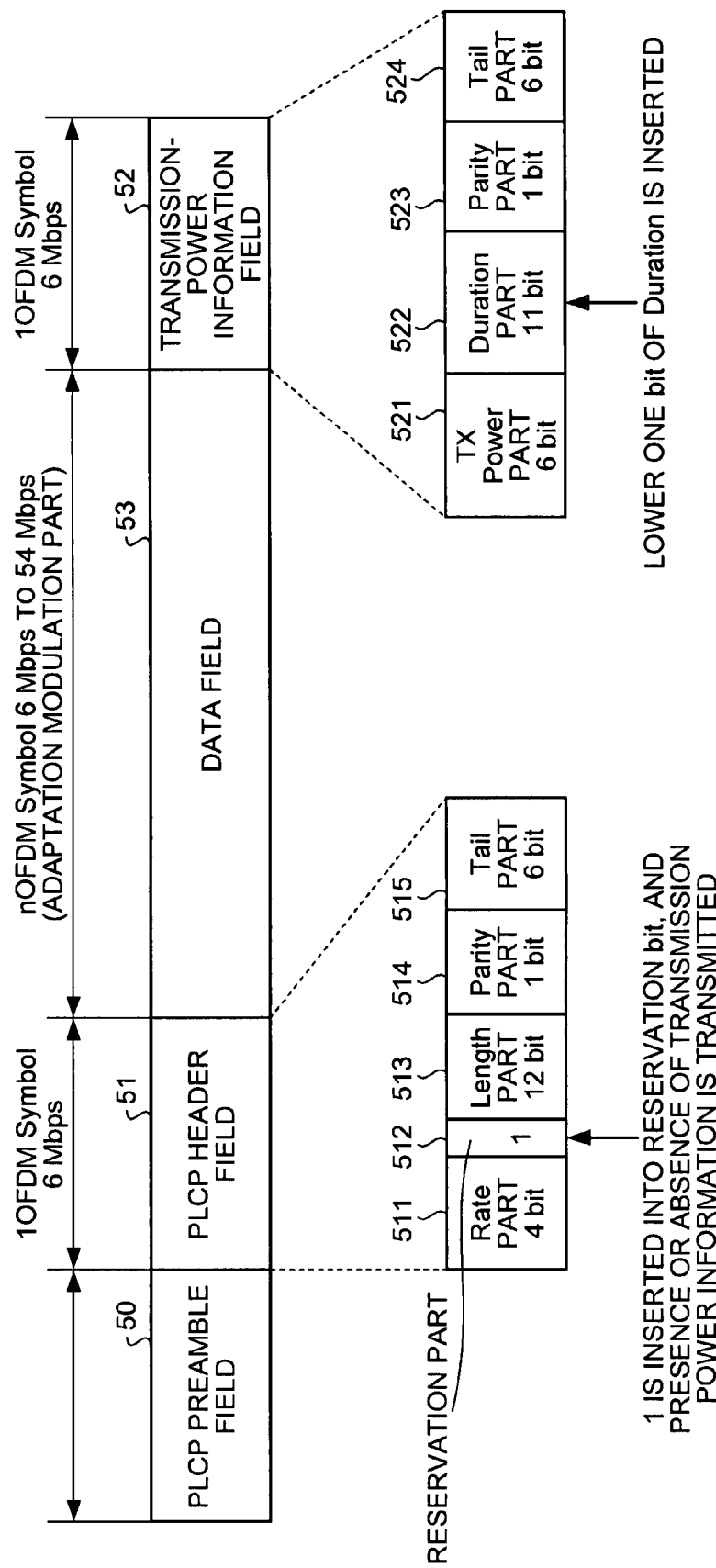
FIG. 3 is an example of a configuration of the PLCP frame including a transmission-radiation power value generated by the frame combiner shown in FIG. 1.

The PLCP frame shown in FIG. 2 includes the transmission-power information field 52 between the PLCP header field 51 and the data field 53. Alternatively, the transmission-power information field 52 can be provided after the data field 53, as shown in FIG. 3.

While the OFDM system is explained as a modulation method, the modulation method is not limited to the OFDM system. A modulation method such as a single carrier system can be also used, when the transmission-power information field 52 can be transmitted at a transmission rate at which the information can be received at a CNR lower than the CNR of the transmission rate of the data field 53.

The operation of the radio device during a reception is explained next. The aerial 1 converts the electromagnetic wave signal including the PLCP frame into an electric signal, and outputs the electric signal to the RF unit 2. The RF unit 2 amplifies the input electric signal, frequency-converts the amplified electric signal into a baseband signal, and outputs the baseband signal to the demodulator 3. The RF unit 2 also outputs the information necessary to calculate a reception-power value to the propagation attenuation calculator 5 as the first reception-power information.

The demodulator 3 demodulates the baseband signal obtained by conversion by the RF unit 2, thereby generating the reception frame. The demodulator 3 outputs the generated reception frame (the PLCP frame shown in FIG. 2, in this case) to the frame separator 4. The demodulator 3 also outputs the second reception-power information necessary to calculate the reception-power value obtained by the demodulation process, to the propagation attenuation calculator 5.

The frame separator 4 separates the PLCP header field 51, the transmission-power information field 52, and the data field 53 of the PLCP frame input from the demodulator 3. In this case, the frame separator 4 determines whether the transmission-power information field 52 is included, based on the value of the Reservation part 512 of the PLCP header field 51. The frame separator 4 outputs the transmission radiation-power information set to the TX Power part 521 in the transmission-power information field 52, to the propagation attenuation calculator 5, and outputs the data set in the data field 53 to the higher device as received data.

The propagation attenuation calculator calculates a reception-power value, using the first reception-power information input from the RF unit 2 and the second reception-power information input from the demodulator 3. The propagation attenuation calculator 5 calculates a propagation attenuation amount TrATT[dB] between the transmission station and the own station, using the calculated reception-power value and the transmission radiation-power information input from the frame separator 4, based on Equation (1).

$$TrATT = TXPow - RXPow \quad (1)$$

TXPow[dB]: transmission radiation-power information, and RXPow[dBm]: reception-power value. The propagation attenuation calculator 5 outputs the propagation attenuation amount TrATT[dB] calculated using Equation (1) to the transmission power controller 6 as propagation attenuation information.

The transmission power controller 6 calculates optimum transmission power TXPow_min[dBm] at each transmission rate, using the propagation attenuation amount TrATT[dB] input from the propagation attenuation calculator 5 and minimum necessary reception power RXPow_min determined in advance for each transmission rate, based on following Equation (2). In this case, the minimum necessary reception power RXPow_min[dBm] is uniquely determined based on the characteristic of the demodulator 3. This value is already known or is obtained in advance from broadcast data such as Beacon.

$$TXPow\_min[i] = RXPow\_min - TrATT[i](i: 1, 2, 3, \ldots, \text{radio station numbers}) \quad (2)$$

The transmission power controller 6 stores calculated optimum transmission power at each transmission rate into the optimum transmission power table by relating the optimum transmission power to the radio device. Specifically, the transmission power controller 6 stores the optimum transmission power of the radio device for each transmission rate, by relating the optimum transmission power to the radio device identifier for identifying the transmitting radio device of the received PLCP frame. Data set in the data field of the PLCP frame is an IP packet and a MAC frame, in general. The IP packet and the MAC frame include the MAC address of the transmitting radio device. The frame separator 4 extracts the MAC address set within the data field 53, and notifies the MAC address to the transmission power controller 6. The transmission power controller 6 uses the MAC address notified from the frame separator 4, as a radio device identifier. The radio device identifier can identify not only the MAC address but also the radio device. A unique ID can be used.

The operation of the radio device during transmission is explained next. When a transmission event occurs, transmission data is input to the frame combiner 8. The transmission power controller 6 selects a transmission rate of transmission to the transmission destination radio device, and notifies the selected transmission rate to the frame combiner 8. The transmission power controller 6 searches the optimum transmission power table, using the radio device identifier for identifying the transmission destination radio device and using the selected transmission rate as search keys, thereby selecting the optimum transmission power TXPow_min to transmit the PLCP frame. The transmission power controller 6 outputs the selected optimum transmission power TXPow_min to the RF unit 2 as power control information, generates transmission radiation-power information obtained by adding an antenna characteristic and system loss to the optimum transmission power TXPow_min, and outputs the added result to the frame combiner 8.

The frame combiner 8 generates a PLCP frame, using the transmission radiation-power information input from the transmission power controller 6 and transmission data input from the higher device. Specifically, the frame combiner 8 sets information used to carry out a reception synchronization process into the PLCP preamble field 50, sets a transmission rate notified from the transmission power controller 6 into the Rate part 511, and sets "1" meaning the including of the transmission power information field into the Reservation part 512. The frame combiner 8 further sets the number of bytes of transmission data into the Length part 513, and sets a code used to detect an error generated from the information set in the Rate part 511, the Reservation part 512, and the Length part 513, into the Parity part 514. The frame combiner 8 sets a value representing the last of the PLCP header field 51 into the Tail part 515, sets transmission radiation-power information notified from the transmission power controller 6 into the TX Power part 521, sets transmission period information into the Duration part 522, sets a code used to detect an error generated from the information set in the TX Power part 521 and the Duration part 522, sets a value representing the last of the transmission-power information field 52 into the Tail part 524, and sets received data into the data field 53. The frame combiner 8 outputs the generated PLCP frame to the modulator 7.

The modulator 7 modulates the PLCP frame input from the frame combiner 8, into the electric signal of the baseband, and outputs the electric signal to the RF unit 2. The RF unit 2 frequency-converts the electric signal of the baseband input from the modulator 7, into a signal having the optimum transmission power TXPow_min instructed from the transmission power controller 6. Further, the aerial 1 converts the signal into the electromagnetic wave signal, and transmits the signal.

Figure 4:
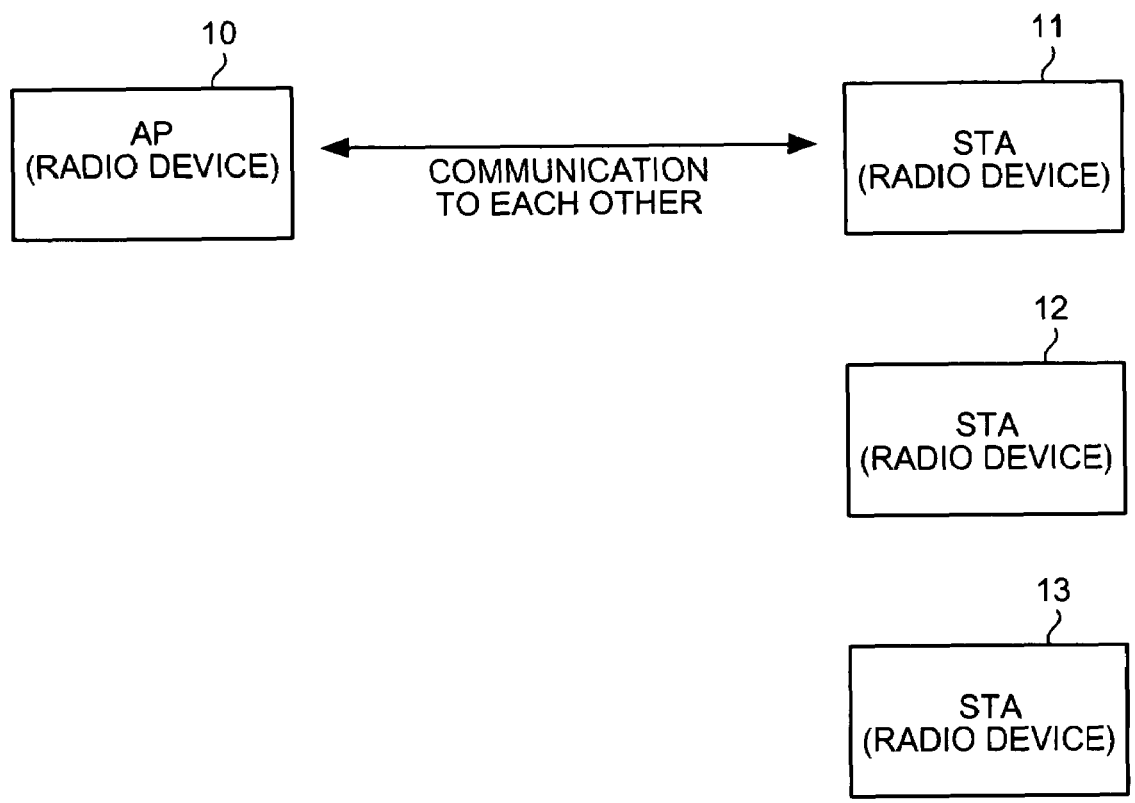
FIG. 4 depicts a configuration of a radio LAN system according to a first embodiment using the radio device of the present invention.
Figure 5:
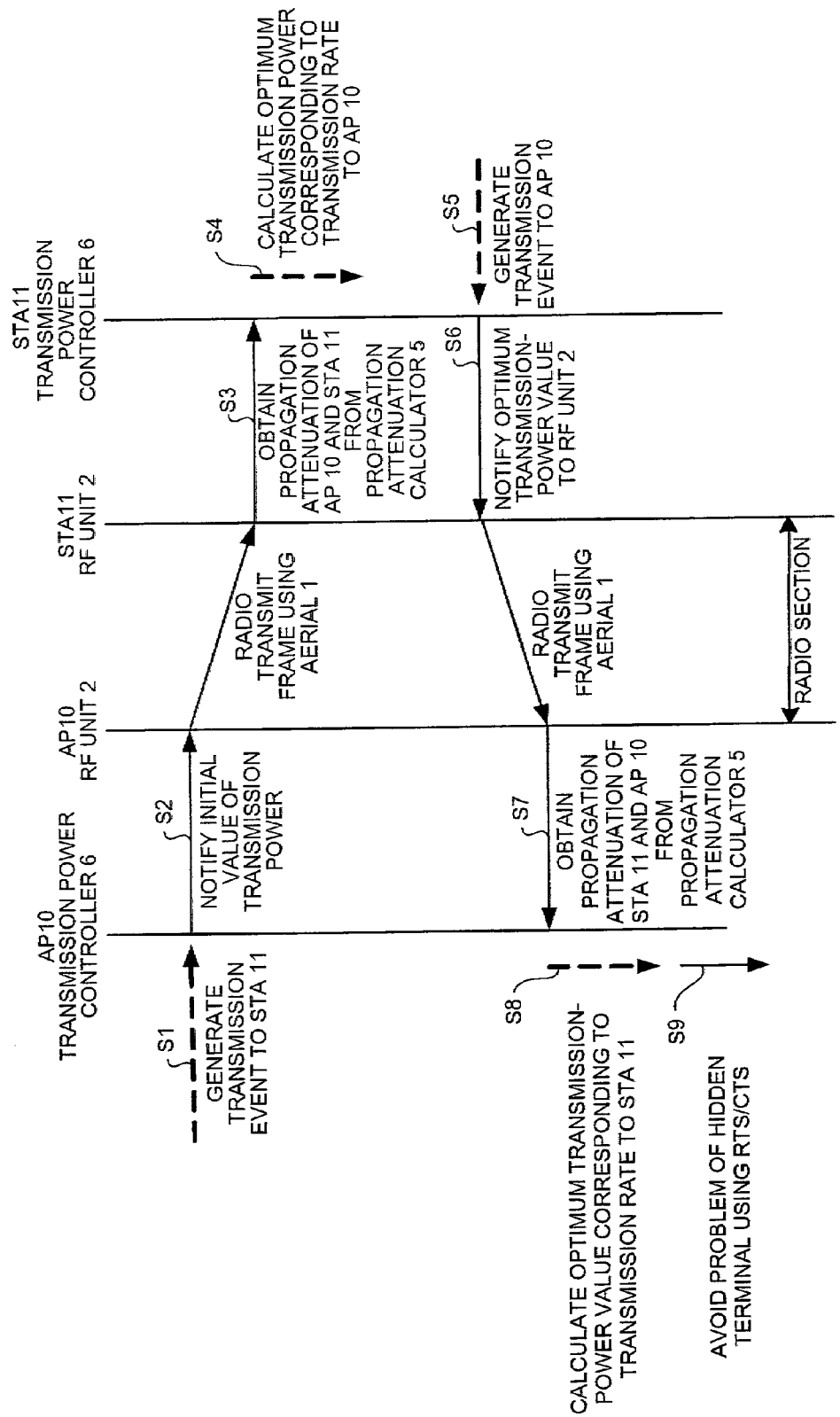
FIG. 5 is a sequence diagram for explaining a power control sequence in the first embodiment performed by the radio device of the present invention.

By applying the radio device shown in FIG. 1 to an AP (Access Point) 10 and STAs (Stations) 11 to 13 shown in FIG. 4, power control carried out when the AP 10 and the STA 11 communicate to each other is explained with reference to FIG. 5.

First, a transmission event from the AP 10 to the STA 11 occurs (step S1). The transmission power controller 6 of the AP 10 notifies power control information to the RF unit 2 using transmission power of an initial value, generates transmission radiation-power information from the transmission power of the initial value, and notifies the transmission radiation-power information to the frame combiner 8 (step S2). The frame combiner 8 of the AP 10 sets the notified transmission radiation-power information (the initial value in this case) to the TX Power part 521 to generate a PLCP frame, and outputs the generated PLCP frame to the RE unit 2 via the modulator 7. The RE unit 2 of the AP 10 transmits (radio transmission) the PLCP frame to the STA 11 using transmission power corresponding to the power control information (the initial value in this case) instructed from the transmission power controller 6.

The RF unit 2 of the STA 11 converts the electric signal including the PLCP frame received via the aerial 1 into a baseband signal, outputs the baseband signal to the demodulator 3, and outputs the first reception-power information necessary to calculate the reception-power value RXPow to the propagation attenuation calculator 5. The demodulator 3 of the STA 11 demodulates the baseband signal, generates a reception PLCP frame, and outputs the PLCP frame to the frame separator 4. The demodulator 3 of the STA 11 outputs the second reception-power information necessary to calculate the reception-power value obtained by the demodulation process to the propagation attenuation calculator 5.

The frame separator 4 of the STA 11 outputs the transmission radiation-power information TXPow set in the TX Power part 521 within the reception PLCP frame to the propagation attenuation calculator 5. When "1" is not set in the Reservation part of the PLCP header, that is, when the PLCP frame does not include the transmission-power information field 52 and also when the transmission radiation-power information is not notified from the AP 10, the frame separator 4 reports the fact to the propagation attenuation calculator 5.

The propagation attenuation calculator 5 of the STA 11 calculates the reception-power value RXPow, using the first reception-power information input from the RF unit 2 and the second reception-power information input from the demodulator 3. The propagation attenuation calculator 5 of the STA 11 obtains a difference between the calculated reception-power value RXPow and the transmission radiation-power information TXPow input from the frame separator 4, based on Equation (1), and calculates the propagation attenuation amount TrATT between the AP 10 and the STA 11. The propagation attenuation calculator 5 notifies the calculated propagation attenuation amount TrATT to the transmission power controller 6 (step S3). When the propagation attenuation calculator 5 receives a notice that the transmission radiation-power information is not notified from the AP 10, the propagation attenuation calculator 5 does not carry out the above calculation, and notifies the fact to the transmission power controller 6.

The transmission power controller 6 of the STA 11 calculates the optimum transmission power TXPow_min optimized at each transmission rate, using the propagation attenuation amount TrATT between the AP 10 obtained from the propagation attenuation calculator 5 and the STA 11 and using the minimum necessary reception power RXPow_min determined in advance for each transmission rate, using Equation (2). The transmission power controller 6 registers the calculated optimum transmission power TXPow_min into the optimum transmission power table by relating the optimum transmission power TXPow_min to the radio device identifier of the AP 10 and each transmission rate (step S4). When the transmission power controller 6 receives from the propagation attenuation calculator 5 that the transmission radiation-power information is not notified from the AP 10, the transmission power controller 6 registers that the transmitting radio device does not carry out the transmission power control according to the first embodiment, and carries out the conventional communication using the normal frame.

Assume that a transmission event from the STA 11 to the AP 10 occurs (step S5). The transmission power controller 6 of the STA 11 selects a transmission rate of transmission to the AP 10, and notifies the transmission rate to the frame combiner 8. The transmission power controller 6 selects the optimum transmission power TXPow_min to transmit the PLCP frame, by searching the optimum transmission power table, using the radio device identifier of the AP 10 and the selected transmission rate as search keys. The transmission power controller 6 notifies the selected optimum transmission power TXPow_min to the RF unit 2 as power control information, generates transmission radiation-power information from the selected optimum transmission power TXPow_min, and notifies the transmission radiation-power information to the frame combiner 8 (step S6).

The frame combiner 8 of the STA 11 sets the notified transmission radiation-power information into the TX Power part 521 of the transmission-power information field 52, generates a transmission PLCP frame, and outputs the generated PLCP frame to the RF unit 2 of the STA 11 via the modulator 7. The RF unit 2 of the STA 11 transmits (radio transmission) the PLCP frame to the AP 10, using transmission power corresponding to the power control information notified from the transmission power controller 6.

The RF unit 2 of the AP 10 converts the electric signal including the PLCP frame received via the aerial 1 into a baseband signal, outputs the baseband signal to the demodulator 3, and outputs the first reception-power information necessary to calculate the reception-power value RXPow to the propagation attenuation calculator 5. The demodulator 3 of the AP 10 demodulates the baseband signal, generates a reception PLCP frame, and outputs the PLCP frame to the frame separator 4.

The frame separator 4 of the AP 10 outputs the transmission radiation-power information TXPow set in the TX Power part 521 within the reception PLCP frame to the propagation attenuation calculator 5. When "1" is not set in the Reservation part of the PLCP header, that is, when the PLCP frame does not include the transmission-power information field 52 and also when the transmission radiation-power information is not notified from the STA 11, the frame separator 4 reports the fact to the propagation attenuation calculator 5.

The propagation attenuation calculator 5 of the AP 10 calculates the reception-power value RXPow, using the first reception-power information input from the RF unit 2 and the second reception-power information input from the demodulator 3. The propagation attenuation calculator 5 of the AP 10 obtains a difference between the calculated reception-power value RXPow and the transmission radiation-power information TXPow input from the frame separator 4, based on Equation (1), and calculates the propagation attenuation amount TrATT between the AP 10 and the STA 11. The propagation attenuation calculator 5 notifies the calculated propagation attenuation amount TrATT to the transmission power controller 6 (step S7). When the propagation attenuation calculator 5 receives a notice that the transmission radiation-power information is not notified from the STA 11, the propagation attenuation calculator 5 does not carry out the above calculation, and notifies the fact to the transmission power controller 6.

The transmission power controller 6 of the AP 10 calculates the optimum transmission power TXPow_min optimized at each transmission rate, using the propagation attenuation amount TrATT between the AP 10 obtained from the propagation attenuation calculator 5 and the STA 11 and using the minimum necessary reception power RXPow_min determined in advance for each transmission rate, using Equation (2). The transmission power controller 6 registers the calculated optimum transmission power TXPow_min into the optimum transmission power table by relating the optimum transmission power TXPow_min to the radio device identifier of the STA 11 and each transmission rate (step S8).

When the transmission power controller 6 of the AP 10 receives the PLCP frame including the transmission-power information field from the SATs 12 and 13 before carrying out communications with the STA 11, the transmission power controller 6 has already registered the optimum transmission power TXPow_min at each transmission rate to the STAs 12 and 13, into the optimum transmission power table. The transmission power controller 6 compares the optimum transmission power TXPow_min to the STA 11 calculated using Equation (2) with the optimum transmission power at the minimum transmission rate to the STAs 12 and 13, and determines whether there is a hidden terminal that is generated in a pseudo manner by changing the optimum transmission power TXPow_min to the STA 11. When it is determined that there is a pseudo hidden terminal (that is, the optimum transmission power TXPow_min of the minimum transmission rate of at least one or both of the STA 12 and the STA 13 is smaller than the optimum transmission power TXPow_min to the STA 11), the transmission power controller 6 executes the hidden-terminal-avoidance control process, using a general transmission request/reception preparation completion (RTS/CTS: Request To Send/Clear To Send) (step S9). The use of the RTS is not determined by the conventional RTS threshold value. The control frame of the RTS/CTS needs to be transmitted by all radio devices as far as possible. Therefore, the control frame is transmitted without receiving a limit of the optimum transmission-power value. When the transmission power controller 6 receives the information from the propagation attenuation calculator 5 that the PLCP frame does not include the transmission radiation-power information part, the transmission power controller 6 registers that the other device does not carry out transmission power control according to the first embodiment, and carries out the convention communication using the normal frame. The AP 10 and the STA 11 carry out the above communications with each other.

As explained above, according to the first embodiment, each radio device within the radio network system independently receives a PLCP frame including a transmission-power information field, thereby calculating a propagation attenuation amount between the transmission and receiving device and the radio device, and calculating optimum transmission power for each transmission rate. At the transmission time, each radio device transmits a PLCP frame using the optimum transmission power. Therefore, power consumption of the radio device can be suppressed, and interference can be prevented.

According to the first embodiment, a radio device that receives a PLCP frame not including the transmission-power information field is registered as the radio device that does not carry out transmission power control. Therefore, even when a conventional radio device is not included in the system, communication can be carried out.

According to the first embodiment, optimum transmission power selected at the transmission time is compared with optimum transmission power at the minimum transmission rate of a radio device different from the transmission destination radio device. When the optimum transmission power at the minimum transmission rate of a radio device different from the transmission destination radio device is smaller than the optimum transmission power selected at the transmission time, the RTC/CTS is applied. Therefore, a pseudo hidden terminal due to the transmission power control can be avoided.

Further, according to the first embodiment, the PLCP header field 51 and the transmission-power information field 52 are transmitted at the minimum transmission rate. Therefore, the transmission radiation-power information can be securely received from the interfered radio device having no guarantee of communication quality, and optimum transmission power can be calculated.

While the communication between the AP and the STA has been explained in the first embodiment, the present invention does not particularly limit the type of the radio device, and the invention can be also applied to communication between the AT and the AP, and communication between the STA and the STA.

While the radio LAN system is explained for example in the first embodiment, it is not particularly limited to the radio LAN system, and TDMA and polling control can be also applied to the access method.

The optimum transmission power can be determined from a statistical process of an average value by repeatedly carrying out communications. The optimum transmission-power value can be shared by transmitting it to other radio devices.

When communication is carried out using the same radio device, calculation of the propagation attenuation amount can be omitted, by calculating the propagation attenuation amount only once at the beginning of the communication.

Second Embodiment

Figure 6:
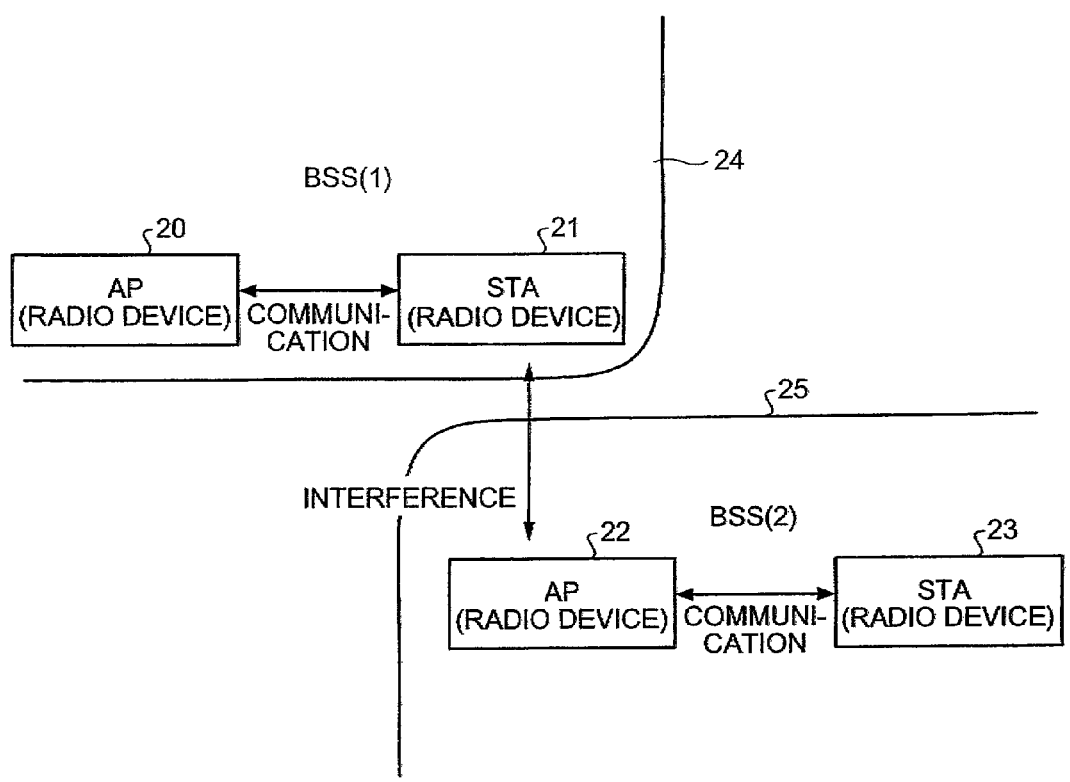
FIG. 6 depicts a configuration of a radio LAN system according to a second embodiment using the radio device of the present invention.

A second embodiment of the present invention is explained below with reference to FIG. 6 and FIG. 7. FIG. 6 depicts a configuration of a radio LAN system according to the second embodiment. In FIG. 6, radio devices 20 to 23 have internal configurations shown in FIG. 1. Among the radio devices 20 to 23, the radio devices 20 and 22 are APs, and the radio devices 21 and 23 are STAs. A first basic service set (hereinafter, BSS (1)) 24 includes the AP 20 and the STA 21. A second basic service set (hereinafter, BSS (2)) 25 includes the AP 22 and the STA 23. In carrying out communications within the same BSS (between the AP 20 and the STA 21, and between the AP 22 and STA 23), transmission power is optimized following a procedure same as that of the first embodiment, and therefore explanations thereof will be omitted.

When communication is carried out between the STA 21 and the AP 22 of different BSSs, the STA 21 and the AP 22 are within a distance in which an electromagnetic wave reaches both the STA 21 and the AP 22. Therefore, unintended interference occurs. A procedure of avoiding the interference generated between the different BSSs is explained with reference to FIG. 7.

Figure 7:
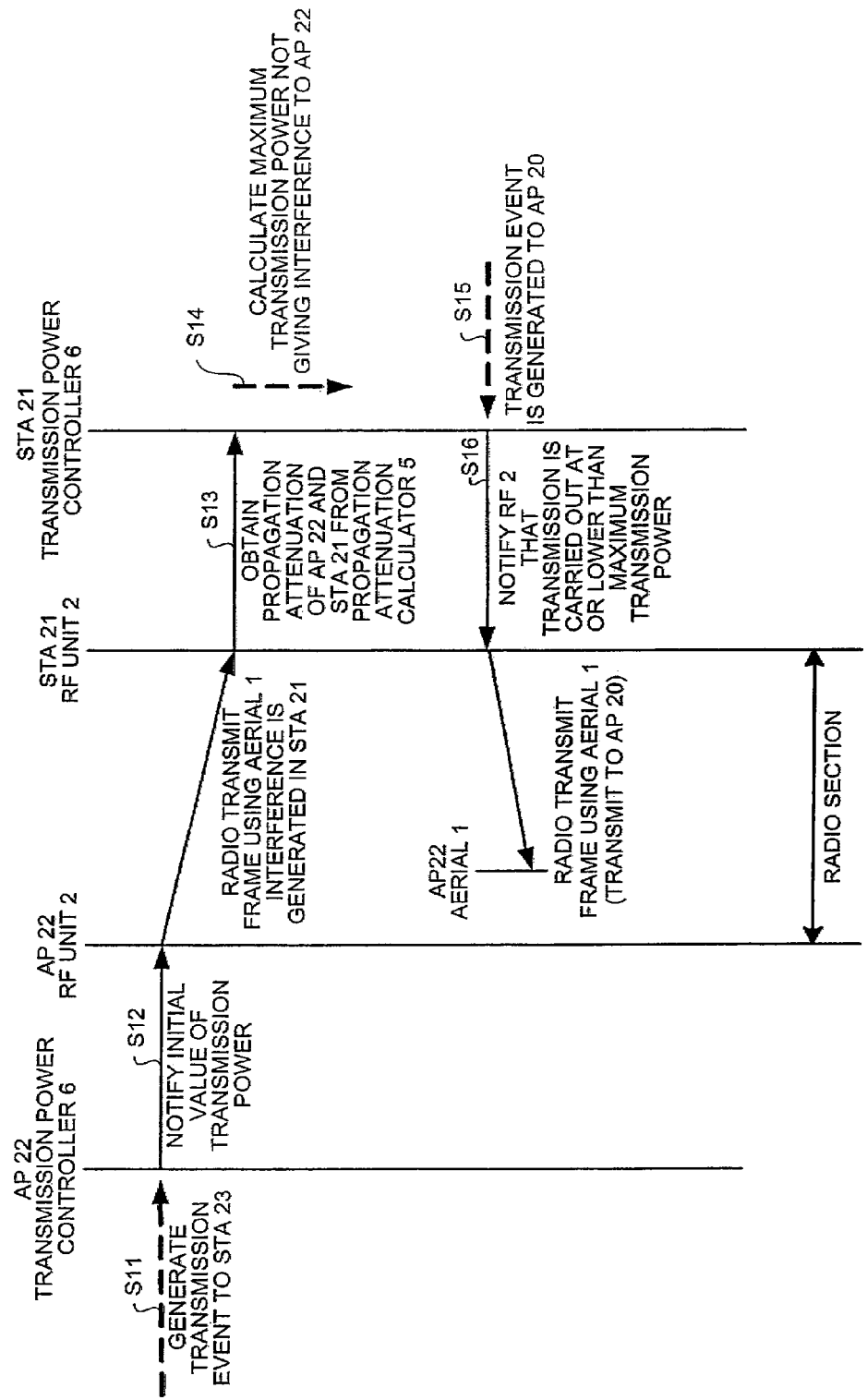
FIG. 7 is a sequence diagram for explaining an interference avoidance procedure in the second embodiment performed by the radio device of the present invention.

FIG. 7 depicts the interference avoidance procedure of the STA 21 which belongs to the BSS (1) 24 and the AP 22 which belongs to the BSS (2) 25. First, assume that a communication event occurs from the AP 22 in the BSS (2) to the STA 23 in the BSS (2) (step S11). Upon receiving the communication event, the transmission power controller 6 of the AP 22 transmits a PLCP frame storing a transmission-power value of an initial value (or optimized for the STA 23) as transmission radiation-power information, to the STA 23, using the transmission power of the initial value or the transmission power optimized for the STA 23, in a similar manner to that of the first embodiment (step S12).

In the STA 21 of the BSS (1) 24 that receives a PLCP frame of a different BSS or a PLCP frame in which only the PLCP header field 51 and the transmission-power information field 52 can be demodulated, the propagation attenuation calculator 5 calculates the propagation attenuation amount TrATT between the AP (the AP 22 in this case) that transmits the PLCP frame and the STA 21, based on Equation (1) (step S13). The propagation attenuation calculator 5 of the STA 21 notifies the calculated propagation attenuation amount TrATT to the transmission power controller 6 of the STA 21.

The transmission power controller 6 of the STA 21 of the BSS (1) 24 calculates the maximum transmission-power value that does not cause interference with the AP 22 (that does not exceed a carrier sense threshold according to the CSMA system), using the notified propagation attenuation amount TrATT (step S14).

Next, a transmission event from the STA 21 to the AP 20 in the same BSS occurs (step S15). The transmission power controller 6 of the STA 21 selects optimum transmission power within a range of maximum transmission-power values calculated at step S14, or maximum transmission-power values not giving interference to the AP 22 belonging to a different BSS, and notifies the selected optimum transmission power to the RF unit 2 (step S16). In this case, when the transmission power exceeds the maximum transmission-power value at the current transmission rate, the transmission rate is controlled to satisfy the maximum transmission-power value by dropping the transmission rate. In other words, the maximum transmission-power value is compared with the optimum transmission power TXPow_min at each transmission rate to the AP 20 registered in the optimum transmission power table, and the transmission rate of the optimum transmission power TXPow_min equal to or lower than the optimum transmission-power value is selected. When the maximum transmission-power value cannot be satisfied by the control to lower the transmission rate, the opportunity of communication of the STA 21 is controlled to be decreased (specifically, CW (Contention Window: transmission waiting period). During the transmission of the control frame by the RTS/CTS, the maximum transmission-power value is not controlled due to the importance of the transmission.

The transmission power controller 6 of the STA 11 calculates the transmission radiation-power information, using the selected optimum transmission power, and transmits (radio transmission) the PLCP frame including the calculated transmission radiation-power information to the AP 20, using the selected optimum transmission power.

As explained above, according to the second embodiment, when the own radio device receives a PLCP frame as an interference frame not destined to the own device during a waiting for a reception of a frame, the own device calculates the propagation attenuation amount, using the transmission radiation information included in the received PLCP frame. Each radio device autonomously calculates a maximum transmission-power value to avoid causing interference to the transmitting radio device of the interference frame, and selects the optimum transmission power equal to or lower than the maximum transmission-power value calculated at the calculation time. Therefore, the interference to the interference frame transmission source can be suppressed. With this arrangement, even when a user randomly installs the AP or the STA at home or in the office, increase in throughput and a connection inability state due to the interference from other BSS can be avoided. Even when radio devices requiring no license are crowded, a communication path can be secured. Consequently, the frequency utilization efficiency can be improved without installing a control radio device.

When an interference frame not interfering the own device is received, the radio device is regarded to have a small communication amount when the interference frequency (the number of interference) is small, and the radio device can be removed from the radio device that carries out interference avoidance (the radio device that prescribes the maximum transmission power of the own device).

When the interference frame not interfering the own device is not received during a constant period, the radio device can be regarded to have a small communication amount, and the radio device can be removed from the radio device that carries out interference avoidance.

While the radio LAN system is explained for example in the second embodiment, it is not limited to the radio LAN system, and the TDMA or the polling control can be also applied to the access method.

By providing a field showing priority of the radio device itself in the transmission frame, priority order can be set between the radio devices, thereby avoiding interference with priority.

The radio device to which the method according to the second embodiment is applied is not limited to the AP or the STA, and the method can be applied to any other optional radio device. When the reach of the frame to satisfy the QoS control is important by setting priority to each queue, a temporary exceeding of the maximum transmission-power value can be permitted.

Third Embodiment

Figure 8:
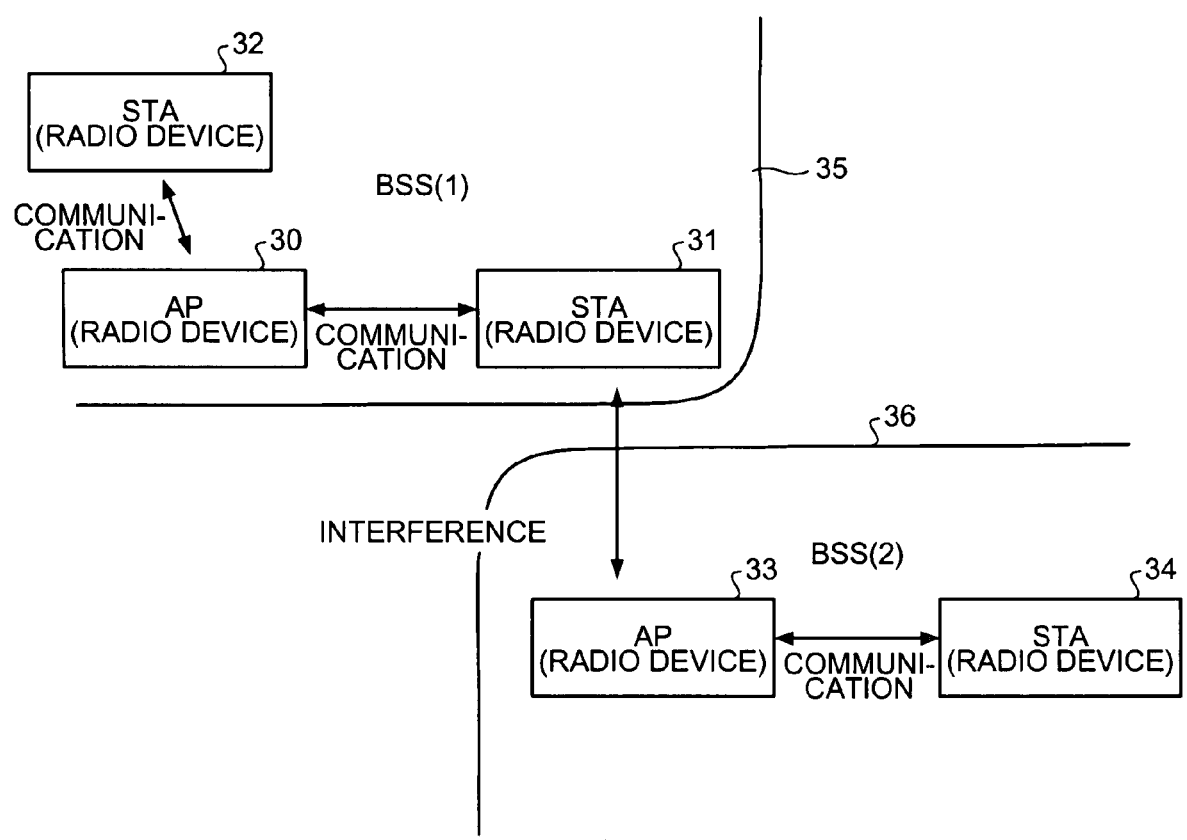
FIG. 8 depicts a configuration of a radio LAN system according to a third embodiment using the radio device of the present invention.
Figure 9:
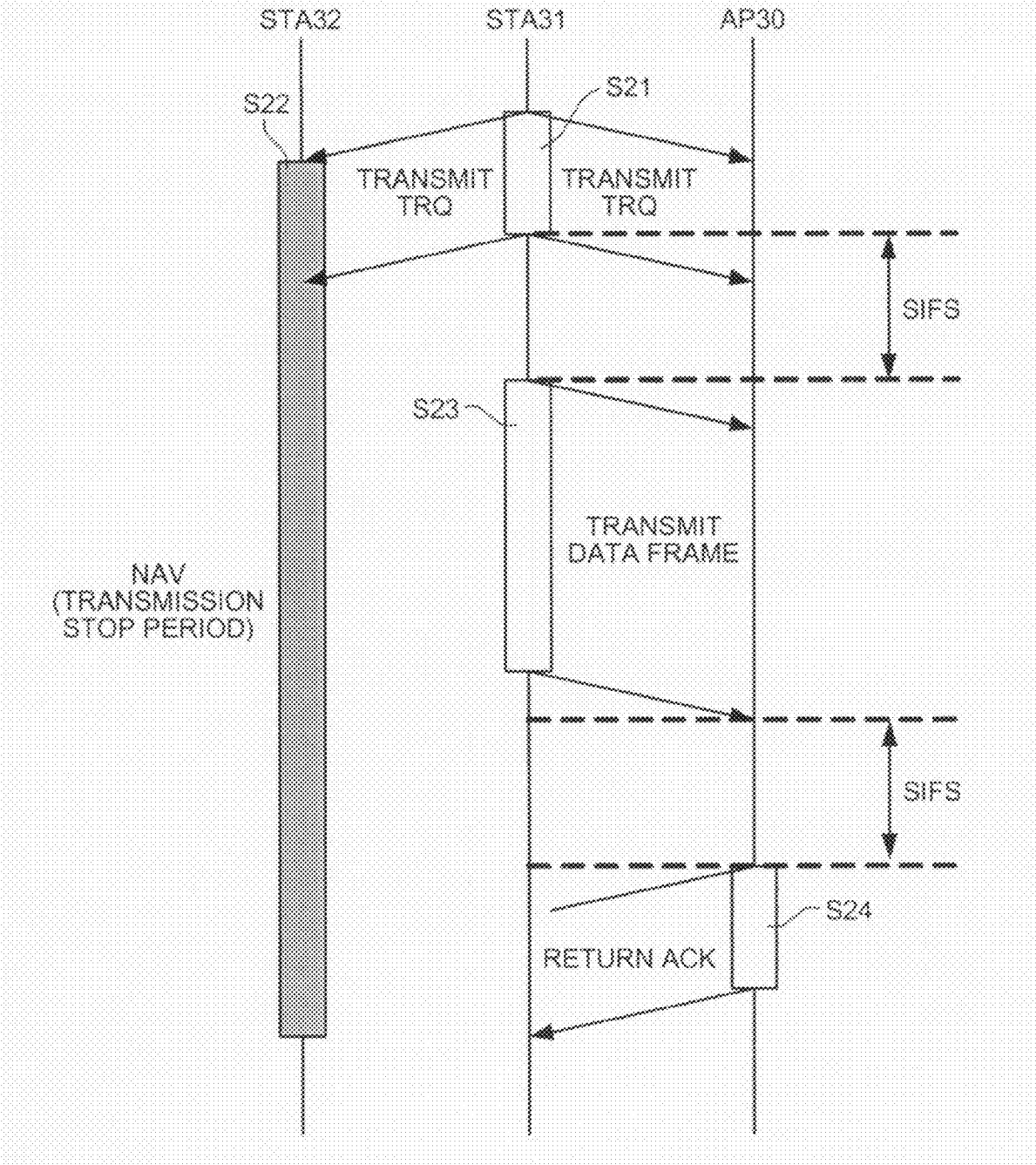
FIG. 9 is a sequence diagram for explaining a communication procedure after interference control in the third embodiment performed by the radio device of the present invention.

A third embodiment of the present invention is explained below with reference to FIG. 8 to FIG. 10. FIG. 8 depicts a configuration of a radio LAN system according to the third embodiment. In FIG. 8, radio devices 30 to 34 have the internal configurations shown in FIG. 1. Among the radio devices 30 to 34, the radio devices 30 and 33 are APs, and the radio devices 31, 32, and 34 are STAs. A BSS (1) 35 includes the AP 30, the STA 31, and the STA 32. A BSS (2) 36 includes the AP 33 and the STA 34. Like in the second embodiment, interference occurs between different BSSs, between the STA 31 and the AP 33. In the third embodiment, a procedure of the STA 31 avoiding the interference to the AP 33 is the same as that explained in the second embodiment, and therefore explanations thereof will be omitted.

The communication procedure after the interference control by the STA 31 is explained with reference to FIG. 9. First, to communicate with the AP 30, the STA 31 broadcasts a control frame called a TRQ (Transmission request) to request for transmission (see FIG. 10), without limiting the transmission power, at the maximum transmission-power value or the control frame transmission power set value (step S21). The application of the TRQ frame is not determined based on a frame length like the RTS threshold value, and the TRQ is used when it can be determined that a temporary hidden terminal occurs due to the own control of the transmission power, by referring to the propagation attenuation amount.

Figure 10:
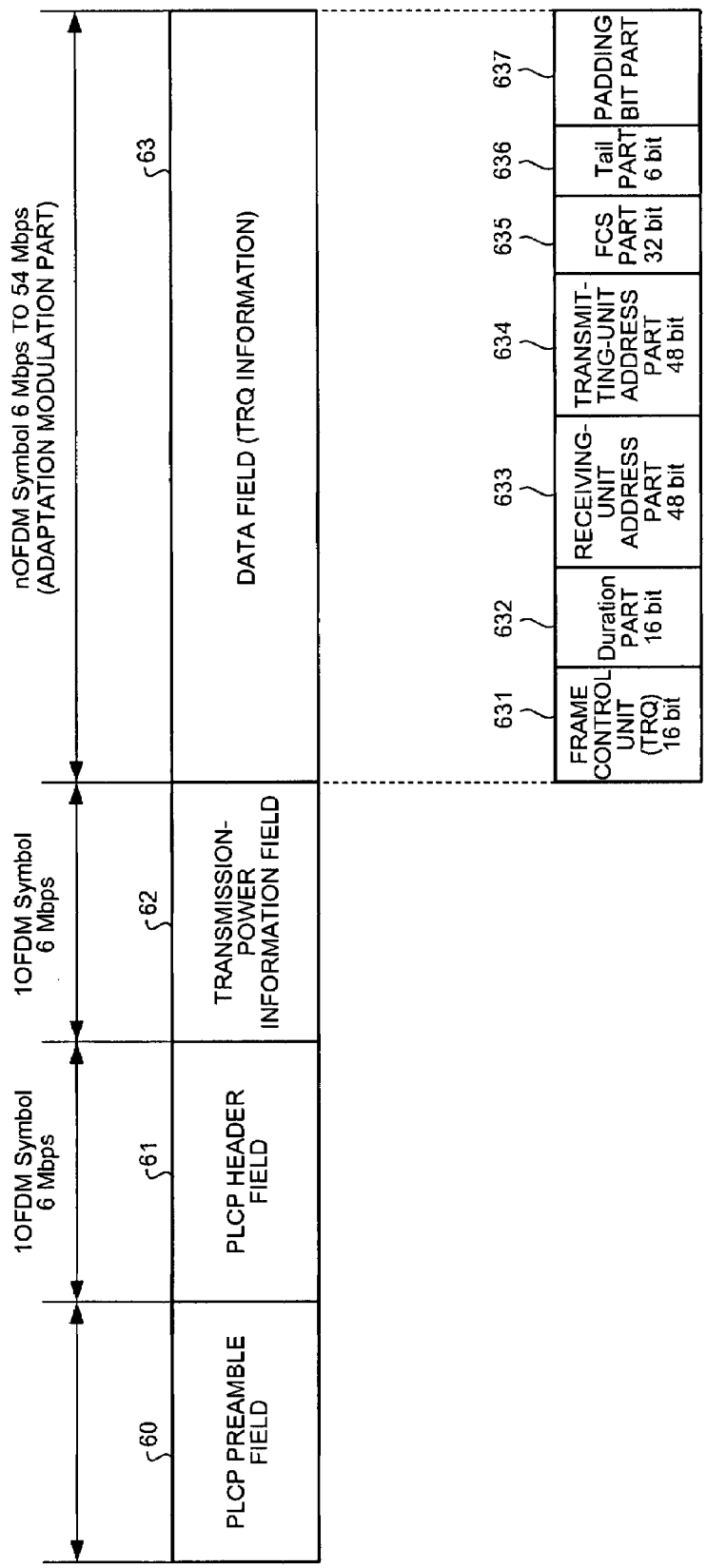
FIG. 10 is an example a configuration of a TRQ frame.

As shown in FIG. 10, the TRQ frame has a PLCP preamble field 60, a PLCP header field 61, a transmission-power information field 62, and a data field 63. The PLCP preamble field 60, the PLCP header field 61, and the transmission-power information field 62 are the same as the PLCP preamble field 50, the PLCP header field 51, and the transmission-power information field 52 of the PLCP frame shown in FIG. 2, respectively, and therefore their explanations will be omitted.

The data field 63 has a 16-bit frame control (TRQ) unit 631, a 16-bit Duration part 632, a 48-bit receiving-unit address part 633, a 48-bit transmitting-unit address part 634, a 32-bit FCS part 635, a six-bit Tail part 636, and a padding bit part 637. The frame control unit 631 is set with information indicating a TRQ frame. The Duration part 632 is set with transmission period information. The receiving-unit address part 633 is set with a MAC address given to the receiving unit. The transmitting-unit address part 634 is set with a MAC address given to the transmitting unit. The FCS part 635 is set with a code to be used to correct an error. The Tail part 636 is set with a value showing the last of valid information within the data field 63. The paddy bit part 637 is set with a value to adjust a length of the data field 63.

The STA 32 receives a TRQ frame, and after a predetermined SIFS (Short InterFrame Space) period since the reception of the TRQ frame from the STA 31, sets an NAV (a transmission stop period: Network Allocation Vector), during a period until when the STA 31 completes the reception using transmission period information set in the Duration part 632 of the TRQ frame received from the STA 31 (step S22). On the other hand, after the SIFS period since the transmission of the TRQ frame, the STA 31 transmits a data frame to the AP 30, using limited transmission power instructed by the transmission power controller 6 of the STA 31, that is, using limited transmission power obtained by the method according to the second embodiment (step S23). After the SIFS period from the completion of the data frame reception, the AP 30 returns the ACK to the STA 31 (step S24).

As described above, according to the third embodiment, in the state that although the STA 31 of which transmission power is limited by the interference avoidance control can obtain a communication state of the STA 32, the STA 32 becomes a new hidden terminal from the STA 32 to the STA 31, resulting in an inability of carrier sense from the STA 32 to the STA 31, the STA 31 can avoid becoming a partial hidden terminal with a small overhead by transmitting the control frame called the TRQ frame at the set value of maximum power or control frame transmission power. In other words, the throughput can be improved by suppressing the overhead, as compared with the case of transmitting the RTS.

While the radio LAN system is explained for example in the third embodiment, application of the present invention is not limited to the radio LAN system, and the type of the radio device of the present invention can be any optional radio device instead of the AP or the STA.

Figure 11:
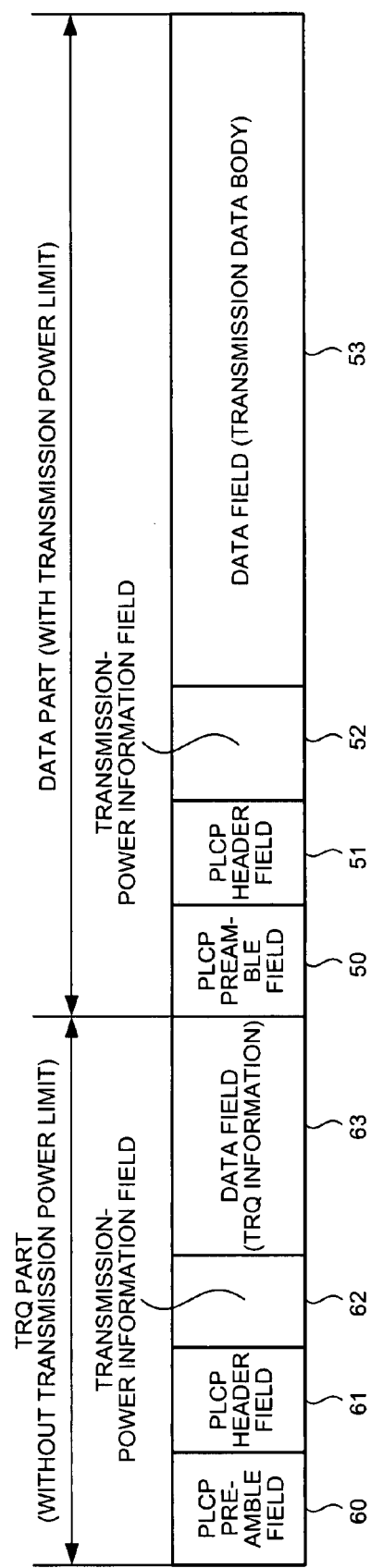
FIG. 11 is an example of a configuration a TRQ frame configuration.

While communication is carried out by sandwiching the SIFS between the TRQ data and the data frame in the third embodiment, a frame having the TRQ part and the data part continuously as shown in FIG. 11 can be also transmitted, without sandwiching the SIFS between the TRQ frame and the data frame.

Fourth Embodiment

Figure 12:
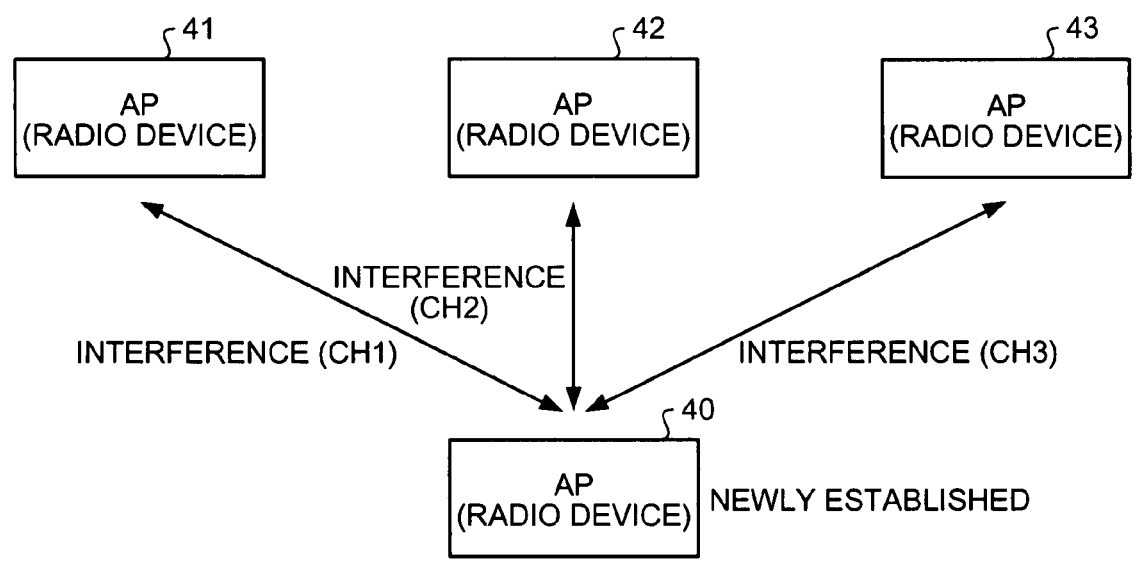
FIG. 12 depicts a configuration of a radio LAN system according to a fourth embodiment using the radio device of the present invention.
Figure 13:
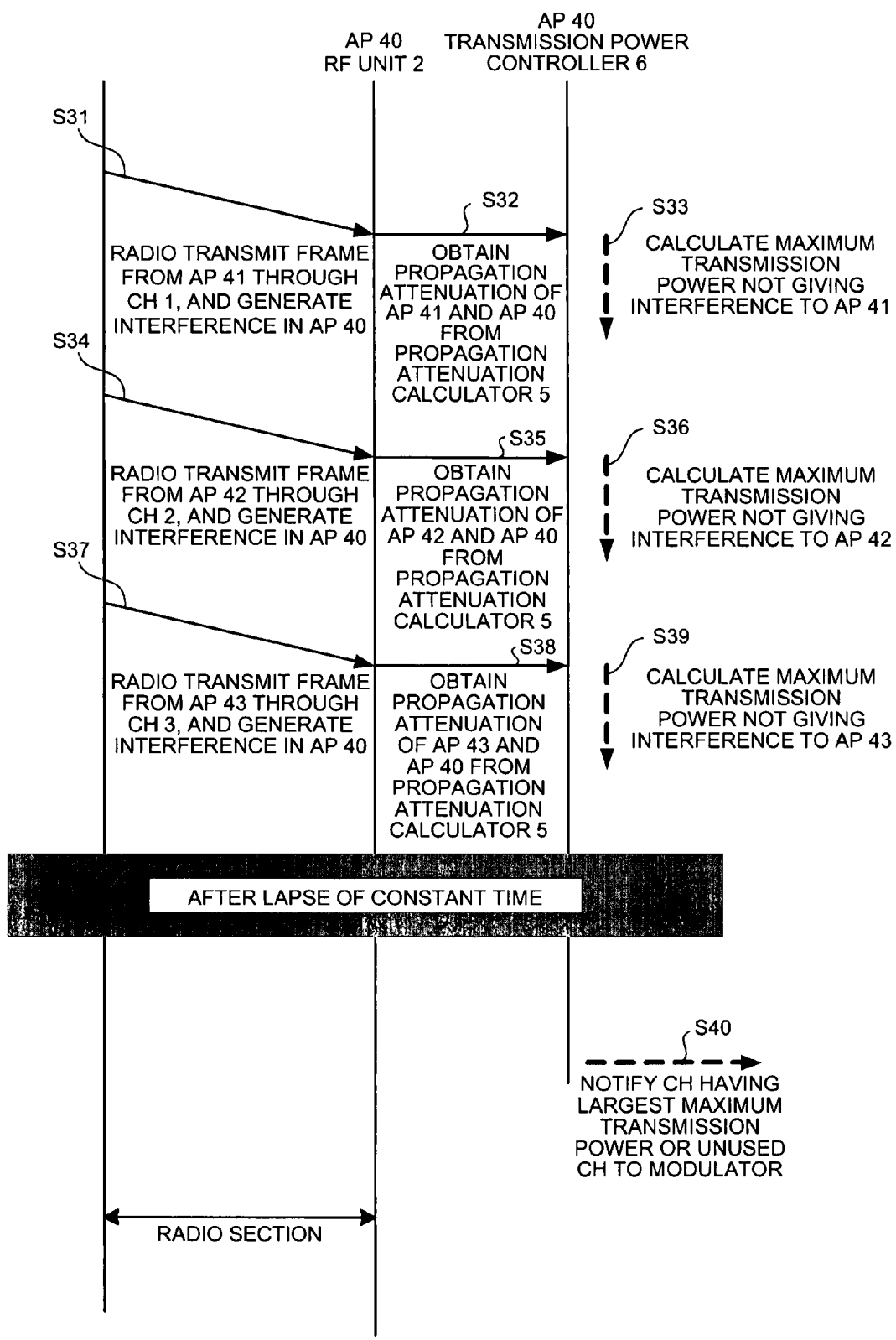
FIG. 13 is a sequence diagram for explaining a communication procedure after an interference control procedure in the fourth embodiment performed by the radio device of the present invention.

A fourth embodiment of the present invention is explained with reference to FIG. 12 and FIG. 13. FIG. 10 depicts a configuration of a radio LAN system according to the fourth embodiment. AP 40 to 43 as radio devices have the internal configuration as shown in FIG. 1, and each of the AP 40 to 43 is included in a separate BSS. It is assumed that the AP 40 is a newly established radio device. In the fourth embodiment, a procedure in which the AP 40 avoids interference to the APs 41 to 43 is the same as that of the second embodiment, and therefore explanations thereof will be omitted.

A communication procedure of the AP 40 after the interference control procedure is explained with reference to FIG. 13. At step S31, the AP 40 receives a PLCP frame from the AP 41 with a channel CH1, and interference occurs in the AP 40.

The propagation attenuation calculator of the AP 40 calculates the propagation attenuation amount TrATT between the AP (the AP 41 in this case) that transmits the PLCP frame and the AP 40, based on Equation (1). The propagation attenuation calculator 5 of the AP 40 outputs the calculated propagation attenuation amount TrATT to the transmission power controller 6 of the AP 40 (step S32).

The transmission power controller 6 of the AP 40 calculates a maximum transmission-power value not giving interference to the AP 41 (step S33).

Similarly, at steps S34 to S36, the AP 40 receives a PLCP frame from the AP 42 with a channel CH2, and calculates a maximum transmission-power value not giving interference to the AP 42, in a similar manner to that explained above. Similarly, at step S37 to step S39, the AP 40 calculates a maximum transmission-power value not giving interference to the AP 43, using a channel CH 3.

After a lapse of a constant time, at step S40, the transmission power controller 6 compares between the maximum transmission-power values of the channels CH1 to CH3, and selects a channel having a largest maximum transmission-power value. The transmission power controller 6 of the AP 40 notifies the selected maximum transmission-power value to the modulator 7 of the AP 40 using the control channel.

As explained above, according to the fourth embodiment, a newly established radio device autonomously selects a channel to be used, using the maximum transmission-power value as an evaluation value. Therefore, frequency resources can be efficiently used.

While the radio LAN system is explained for example in the fourth embodiment, it is not limited to the radio LAN system, and the TDMA or the polling control can be also used in the access method.

While the AP is explained for example in the fourth embodiment, the type of the communication device is not limited thereto.

INDUSTRIAL APPLICABILITY

As described above, the radio device and the interference avoidance method by transmission power control according to the present invention are useful for digital radio communication systems. Particularly, the present invention is suitable for radio LAN systems as IP packet radio communication.

The invention claimed is:

1. A radio device applied to a radio communication system which carries out an access control using a CSMA system, the radio device comprising:
   a propagation-attenuation calculating unit that calculates a propagation attenuation amount from a received frame, which was transmitted by a transmitting radio device, the propagation attenuation amount being calculated based on reception power and transmission radiation-power information included in the received frame; and
   a transmission-power controlling unit that
   calculates optimum transmission power at each transmission rate based on the propagation attenuation amount calculated by the propagation-attenuation calculating unit and minimum necessary reception power determined for each transmission rate,
   registers each calculated optimum transmission power into an optimum transmission power table by relating the optimum transmission power to a radio device identifier for identifying the transmitting radio device and each transmission rate, and;
   when a frame is to be transmitted to a transmission destination radio device, performs the following:
      selects an optimum transmission power to the transmission destination radio device based on the optimum transmission power table, the radio identifier of the transmission destination radio device, and the transmission rate, thereby carrying out a transmission power control of transmitting the selected optimum transmission power as a transmission frame including the selected optimum transmission power as transmission radiation-power information, and
      detects whether a value smaller than the selected optimum transmission power is registered as the optimum transmission power at the minimum transmission rate of a radio device different from the transmission destination radio device in the optimum transmission power table; and
   a hidden-terminal avoidance-control executing unit that executes a predetermined hidden-terminal-avoidance control process when the transmission-power controlling unit detects the presence of the smaller value in the optimum transmission power table.

2. The radio device according to claim 1, wherein the predetermined hidden-terminal-avoidance control process is a process according to a transmission request frame and a reception-preparation completion frame.

3. The radio device according to claim 1, wherein the predetermined hidden-terminal-avoidance control process is any one of a process of transmitting a TRQ frame by broadcast and a process of providing a transmission stop period using transmission period information set in the TRQ frame after a predetermined period since the reception of the TRQ frame.

4. The radio device according to claim 1, wherein the transmission-power controlling unit carries out the transmission power control only when transmitting a data frame including user data, and selects transmission power larger than the transmission power of the data frame when transmitting a control frame by the predetermined hidden-terminal-avoidance control process.

5. The radio device according to claim 1, wherein
   when the transmission-power controlling unit receives a PLCP frame from a radio device belonging to a different radio network system, the transmission-power controlling unit calculates a maximum transmission-power value that does not cause interference with a transmitting radio device of the received PLCP frame, and
   when maximum transmission power of a transmitting radio device selected based on the optimum transmission power table, a radio identifier, and a transmission rate exceeds the maximum transmission-power value, the transmission-power controlling unit selects optimum transmission power of a transmission rate at which the optimum transmission power becomes equal to or lower than the maximum transmission-power value.

6. The radio device according to claim 1, wherein when a frame received from the transmitting radio device includes the transmission radiation-power information, the radio device carries out a transmission power control using the transmission radiation-power information, and transmits a frame including the transmission radiation-power information, and when the frame received from the transmitting radio device does not include the transmission radiation-power information, the radio device carries out communication using a normal frame.

7. The radio device according to claim 1, wherein the transmission-power controlling unit registers a channel through which a frame is received from the transmitting radio device into the optimum transmission power table, and selects a channel having largest optimum transmission power for the transmission.

8. An interference avoiding method by transmission power control applied to a radio communication system which carries out an access control using a CSMA system, the interference avoiding method comprising:
   calculating a propagation attenuation amount from a transmitting radio device of a reception frame to the own device, based on reception power and transmission radiation-power information included in the reception frame;
   calculating an optimum transmission power at each transmission rate based on the calculated propagation attenuation amount and a minimum necessary reception power determined for each transmission rate;
   registering each calculated optimum transmission power into an optimum transmission power table by relating the optimum transmission power to a radio device identifier for identifying the transmitting radio device and each transmission rate;
   selecting, when transmitting a frame to a transmission destination radio device, the optimum transmission power to the transmission destination radio device as registered in the optimum transmission power table, in relation to the radio identifier of the transmission destination radio device, and the transmission rate;
   carrying out a transmission power control of transmitting the selected optimum transmission power as a transmission frame including the selected optimum transmission power as transmission radiation-power information;

detecting whether a value smaller than the selected optimum transmission power is registered as the optimum transmission power at the minimum transmission rate of a radio device different from the transmission destination radio device in the optimum transmission power table; and executing a predetermined hidden-terminal-avoidance control process when the detecting step detects the presence of the smaller value.

9. The interference avoiding method according to claim 8, wherein the predetermined hidden-terminal-avoidance control process is a process according to a transmission request frame and a reception-preparation completion frame.

10. The interference avoiding method according to claim 8, wherein the predetermined hidden-terminal-avoidance control process is any one of a process of transmitting a TRQ frame by broadcast and a process of providing a transmission stop period using transmission period information set in the TRQ frame after a predetermined period since the reception of the TRQ frame.

11. The interference avoiding method according to claim 8, wherein the carrying out step includes carrying out the transmission power control only when transmitting a data frame including user data, and the selecting step includes selecting a transmission power larger than the transmission power of the data frame when transmitting a control frame by the predetermined hidden-terminal-avoidance control process.

12. The interference avoiding method according to claim 8, wherein when receiving a PLCP frame from a radio device belonging to a different radio network system, the optimum transmission power is calculated by calculating a maximum transmission-power value that does not cause interference with a transmitting radio device that transmitted the PLCP frame, and when maximum transmission power of a transmitting radio device selected based on the optimum transmission power table, a radio identifier, and a transmission rate exceeds the maximum transmission-power value, the selecting step includes selecting an optimum transmission power of a transmission rate at which the optimum transmission power becomes equal to or lower than the maximum transmission-power value.

13. The interference avoiding method according to claim 8, wherein when a frame received from the transmitting radio device includes the transmission radiation-power information, the carrying out step includes carrying out a transmission power control using the transmission radiation-power information, and transmitting a frame including the transmission radiation-power information, and when the frame received from the transmitting radio device does not include the transmission radiation-power information, the carrying out step includes carrying out communication using a normal frame.

14. The interference avoiding method according to claim 8, wherein the registering includes registering a channel through which a frame is received from the transmitting radio device into the optimum transmission power table, and the selecting includes selecting a channel having largest optimum transmission power for the transmission.

* * * * *